United States Patent [19]

DeLeeuw et al.

[11] Patent Number: 5,828,900
[45] Date of Patent: Oct. 27, 1998

[54] INTERNATIONAL MULTIPLE-BYTE CHARACTER GENERATOR SUPPORT IN APPLICATION SHARING WHICH DISTINGUISHES GUEST KEYBOARD INPUT FROM HOST KEY BOARD AND BYPASSING EXECUTION OF THE GENERATOR MODULE WHEN GUEST KEYBOARD INPUT IS DETERMINED

[75] Inventors: William C. DeLeeuw; James Thompson, both of Hillsboro, Oreg.

[73] Assignee: Intel Corporation, Santa Clara, Calif.

[21] Appl. No.: 579,722

[22] Filed: Jan. 3, 1996

[51] Int. Cl.[6] ..................................................... G06F 13/00
[52] U.S. Cl. ......................... 395/836; 395/712; 395/834; 395/882; 395/887; 371/24; 371/25.1; 371/27.5; 371/57.1
[58] Field of Search ....................... 345/471; 364/709.12; 395/186, 182.02, 200.58, 500, 825, 847, 887, 712, 834, 836, 882; 371/24, 25.1, 27.5, 57.1

[56] References Cited

U.S. PATENT DOCUMENTS

| | | | |
|---|---|---|---|
| 4,386,416 | 5/1983 | Giltner et al. | 395/888 |
| 4,851,997 | 7/1989 | Tatara | 395/200.58 |
| 5,065,360 | 11/1991 | Kelly | 364/709.12 |
| 5,117,494 | 5/1992 | Costes et al. | 395/182.02 |
| 5,121,472 | 6/1992 | Danish et al. | 395/887 |
| 5,221,921 | 6/1993 | Statt | 345/471 |
| 5,530,893 | 6/1996 | Sugi | 395/825 |
| 5,561,819 | 10/1996 | Gephardt et al. | 395/847 |
| 5,623,597 | 4/1997 | Kikinis | 395/186 |
| 5,673,418 | 9/1997 | Stonier et al. | 395/500 |

Primary Examiner—Thomas C. Lee
Assistant Examiner—Chien Yuan
Attorney, Agent, or Firm—William H. Murray, Esq.; N. Stephan Kinsella, Esq.

[57] ABSTRACT

Host multiple-byte character generator processing of guest keyboard events is blocked during applications sharing. A guest keyboard driver generates guest keyboard events which may be processed by any guest multiple-byte character generator. The guest events are transmitted to a host for use in shared applications. A patch instruction is written over a host storage queue which causes a jump to a patch subroutine when an attempt is made to deposit host keyboard events in the storage queue. Host keyboard events are marked by the patch subroutine and the marked host events are deposited in a shadow queue which is disposed in parallel with the host storage queue. Guest events also are deposited in the shadow queue. Untranslated host and single-byte character guest events, are stored in the host storage queue. When a shared application requires data from the host storage queue, the outgoing event is examined for origin, such as by examining the shadow queue. If the event is a guest event, a call is made to a host-executed applications sharing program, which in turn calls the host-multiple character generator. The call to the host multiple-byte character generator bypasses execution of the generator to preventing it from processing guest events prior to their entry into the shared application. In an embodiment of the invention, if the guest transmits a multiple-byte character to the host, the host-executed applications sharing system calls a host operating system module responsible for entering the guest multiple-byte character into a shared application. The guest multiple-byte character is entered into the shared application without a call being made to the host multiple-byte character generator.

30 Claims, 6 Drawing Sheets

INTERNATIONAL MULTIPLE-BYTE CHARACTER GENERATOR SUPPORT IN APPLICATION SHARING WHICH DISTINGUISHES GUEST KEYBOARD INPUT FROM HOST KEY BOARD AND BYPASSING EXECUTION OF THE GENERATOR MODULE WHEN GUEST KEYBOARD INPUT IS DETERMINED

BACKGROUND OF THE INVENTION

1. Field of the Invention

This invention relates to the field of applications sharing between computers.

2. Description of the Related Art

Applications sharing involves the sharing of one or more application programs between one or more computer users. The applications reside on a host computer, and are shared with one or more remote computers, generally identified as guests. All mouse input to a shared application is made via a shared mouse input stream and all alphanumeric input to a shared application is performed via a shared keyboard input stream. The shared input streams are actually part of the host system, since the shared applications reside on and are implemented by the host system.

Applications sharing can become difficult and error prone if any participant, especially the host alone or the host and one or more guests uses a multiple-byte character generator, for example an Input Method Editor (IME) module. Multiple-byte character generators typically are part of operating systems and are designed to enable meaningful keyboard input from persons whose written language has thousands of characters. Far-eastern languages, such as Japanese and Chinese are two examples of such languages. For example, the Chinese written language is comprised of ideograms, wherein each character typically represents a word. The Japanese written language is a set of syllabaries known as hiragana and katakana, wherein each character represents a single syllable.

The great number of individual characters in such languages substantially outnumber the keys available on a standard keyboard. Generation of a single character therefore typically requires more than one keystroke and the single character is usually represented by multiple bytes of data. The multiple-byte character generator generates the single character and multiple bytes by translating the input from the multiple keystrokes. Multiple-byte character generators obviously must be language specific, that is they are designed to convert predetermined patterns of keystrokes into multiple bytes of data representing predetermined characters of a defined language. The multiple bytes generated typically number two, the data being generated therefore being known as double-byte character strings (DBCS).

All keyboard input to a host in an applications sharing configuration is processed through the host's input stream. For example, host keyboard events, i.e., data originating from host keyboard input, is dumped into a storage module or queue which transfers the events in a first-in, first-out (FIFO) basis as necessary for use by, for example, the shared applications. Guest keyboard events also are typically input to the storage module, sometimes interleaving with host keyboard events, the event arriving first being entered first. All events coming out of the storage queue, irrespective of whether they are host or guest keyboard events, are identically handled by the host and processed through the host input streams. If a host has a multiple-byte character generator, all events exiting the storage queue, whether they are host or guest events, are processed or translated by the host multiple-byte character generator. This can cause problems in typical applications sharing configurations.

For example, the host multiple-byte character generator will translate guest keyboard events which may already have been translated by the guest multiple-byte character generator or which do not require multiple-byte character generator processing, e.g., which correspond to a western written language or alphabet. The host multiple-byte character generator processing of guest keyboard events often corrupts the events and results in the generation of unpredictable and erroneous operating system characters for ultimate use in the shared applications.

A system is needed for applications sharing systems in which the host node includes a multiple-byte character generator, which system will disable or otherwise prevent the host multiple-byte character generator from processing guest keyboard events. Such a system would rectify the common problem of erroneous and/or unnecessary translations by the host multiple-byte character generator of guest keyboard events.

SUMMARY OF THE INVENTION

A computer-implemented method for sharing of one or more applications by a host and at least one guest, the host and at least one guest generating host and guest keyboard input, respectively, the host having a multiple-byte character generating module for processing keyboard input to generate multiple-byte characters, wherein keyboard input from a guest is received and the multiple-byte generating module of the host is bypassed to prevent the multiple-byte generating module from processing guest keyboard input.

BRIEF DESCRIPTION OF THE DRAWINGS

The following detailed description will be more fully understood with reference to the accompanying drawings in which.

DETAILED DESCRIPTION OF THE PREFERRED EMBODIMENTS

Figure 1:
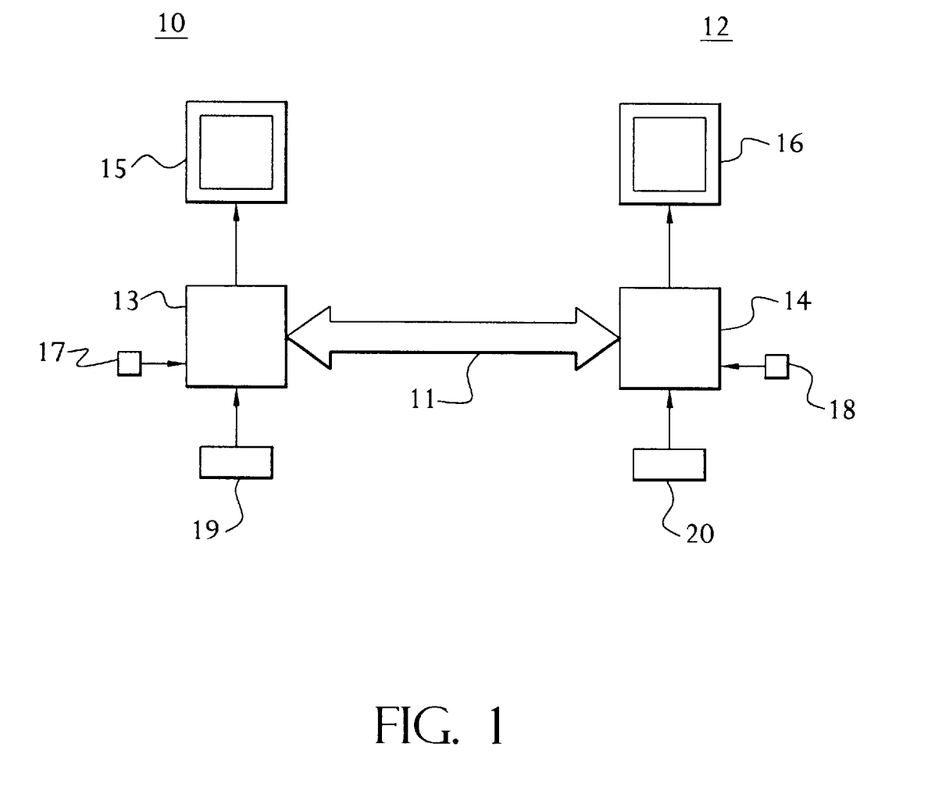
FIG. 1 is a block diagram of coupled application-sharing hardware, including a host computer a guest computer.

Referring to FIG. 1, two or more remote computer devices, such as remote personal computers, are coupled to share applications. A first computer 10 is bidirectionally coupled over network 11 to second computer 12. Network 11 is preferably a local area network (LAN) or wide area network (WAN) and may be, for example, a connection made by a digital data line, telephone line, optical fiber, satellite or microwave transmission, coaxial cable or any other suitable communications link. First and second computers 10 and 12 include, for example, central processing units (CPUs) 13, 14 coupled to monitors 15, 16, respectively, for data display. Mouse devices 17, 18 and keyboards 19, 20 are coupled to CPUs 13, 14, respectively, for data input. Although FIG. 1 shows only two remote computer devices coupled by bidirectional network 11, additional computer devices may be coupled over network 11 in such a manner as to share applications and, as will be explained below, this invention can be used on such configurations having more than two participants.

Figure 2:
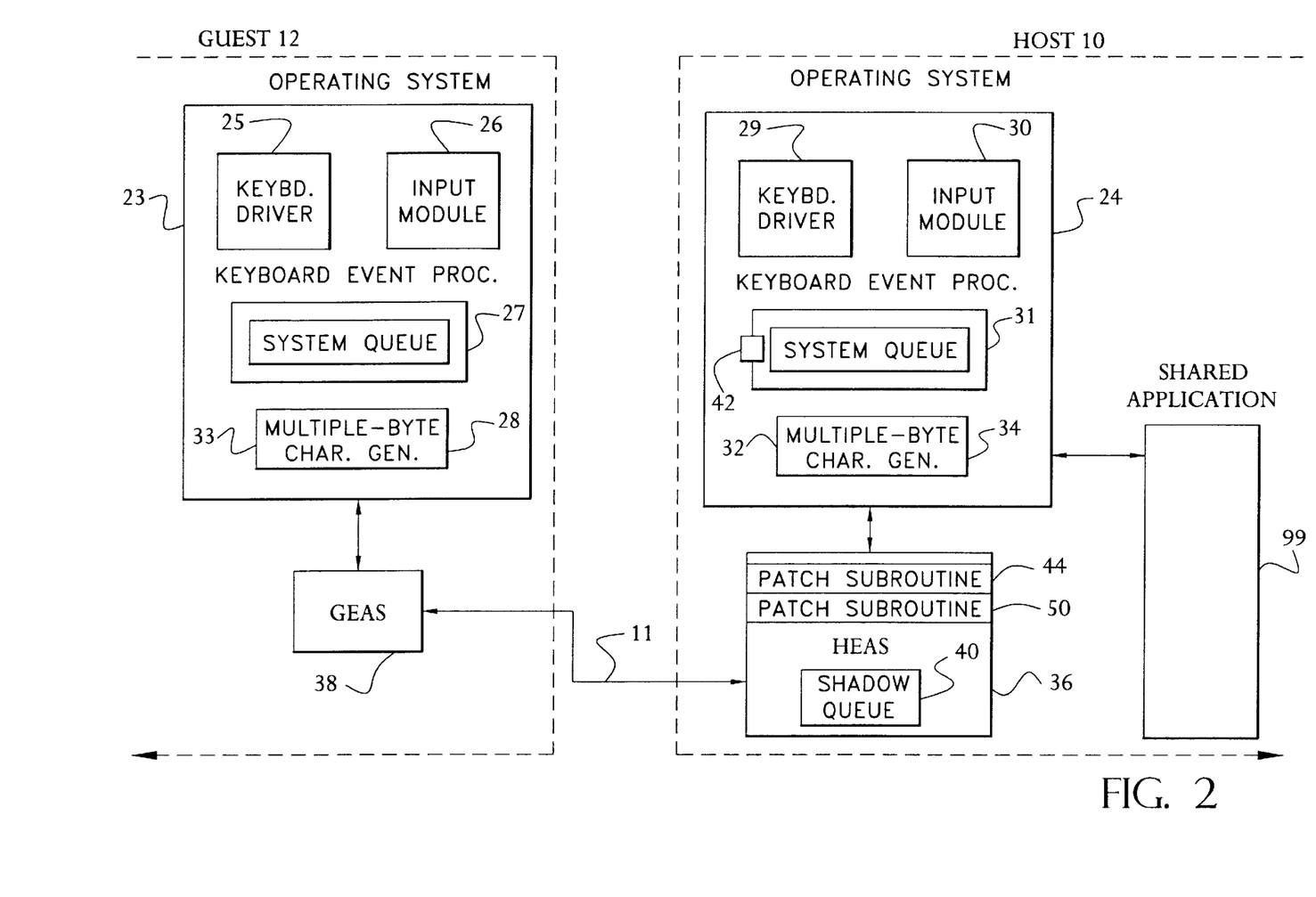
FIG. 2 is a block diagram of software architecture of an application-sharing system of the invention.

Referring now to FIG. 2, software architecture for an embodiment of the invention concerning applications sharing between host 10 and guest 12 is shown. Host 10 and guest 12 are coupled via bidirectional data network 11. Each of guest 12 and host 10 include respective operating systems 23 and 24. Operating systems 23 and 24 manage the hardware resources of guest 12 and host 10, respectively, and invoke and control other programs resident in memory (not shown in FIG. 2) accessible by guest 12 and host 10.

Operating systems 23 and 24 of guest 12 and host 10 include various subroutines including input modules or Input Management Module (IMMs) 26, 30, respectively. Input modules 26 and 30 generally govern the interface between operating systems 23 and 24 and a user or users at guest 12 and host 10, respectively, and invoke and control other subroutines which are part of operating systems 23 and 24, such as keyboard drivers 25 and 29 and keyboard event procedures 27 and 31, respectively. Keyboard drivers 25 and 29 typically generate keyboard events in association with input from a keyboard. Keyboard event procedures 27 and 31 manage events from keyboard drivers 25 and 29. For example, keyboard event procedures 27 and 31 manage placement of, for example, keyboard events, into system queues 28 and 32, respectively.

Operating system 24 of host 10 includes multiple-byte character generator 34. Operating system 23 of guest 12 may or may not also include multiple-byte character generator 33 and the invention has provisions for handling either case. A multiple-byte character generator is a software module which converts a series of keystrokes or keyboard events into a multiple-byte of data representing a single character, as conventionally is necessary when entering commands comprised of characters from a far-eastern language. The multiple-byte character generator builds the multiple-byte character, which represents the predetermined far-eastern language character. Typically, the multiple-byte character generator processes a keyboard event as it leaves the corresponding system queue. For example, guest multiple-byte character generator 33 conventionally translates keyboard events as they exit system queue 28 in guest 12 operating system 23. Host multiple-byte character generator 34 typically processes keyboard events as they exit host system queue 32. Since in conventional applications sharing configurations, guest keyboard events are entered into host system queue 32 prior to their use in shared application 99, guest keyboard events in conventional systems typically are subject to translation by host multiple-byte character generator 34, which as discussed above potentially can misinterpret the guest keyboard events as well as corrupt host data on its way to shared application 99.

In the embodiment shown in FIG. 2, the application program is shared application 99. Shared application 99 is implemented on host 10, i.e. is loaded into RAM memory associated with host 10, but remains accessible for data input from and output to, and further interaction with, guest 12, via bidirectional network 11. Shared application 99 may be, for example, a word processing program enabling creation, editing, printing, etc. of text, which is displayed to participants on video display monitors at guest 12 and host 10 (not shown). Alternatively, shared application 99 may be any other suitable type of application program.

The software architecture of host 10 also includes host-executed applications-sharing (HEAS) program 36.
Similarly, guest 12 is provided with guest-executed applications-sharing program (GEAS) 38. HEAS 36 and GEAS 38 enable host 10 and guest 12, respectively, to share shared application 99, thereby enabling data entry to shared application 99 from each of guest 12 and host 10 and essentially simultaneous output of data to each of guest 12 and host 10 from shared application 99. For example, where shared application 99 is a word processing program, users at host 10 and guest 12 may share and operate on the same document, such as by creating, editing, or deleting text. The output of shared application 99 appears essentially simultaneously on monitors (not shown in FIG. 2) associated with host and guest 10 and 12, respectively. A person of ordinary skill will recognize that more than one guest may share application 99, i.e., more than one guest can be coupled to host 10 and to other guests, and share and process data with shared application 99 resident on host 10, in the manner described above. A person of ordinary skill also will recognize that more than one application can reside on host 10 and be shared with one or more guests in the manner described above.

Also shown in FIG. 2 is patch instruction 42, which may be disposed on entry points to keyboard event procedure 31. In an embodiment, patch instruction 42 causes a jump to patch subroutine routine 44 whenever keyboard event procedure 31 is called. Also shown is subroutine 50. Patch instruction 42, patch subroutine 44 and subroutine 50 are explained in more detail below.

Figure 3:
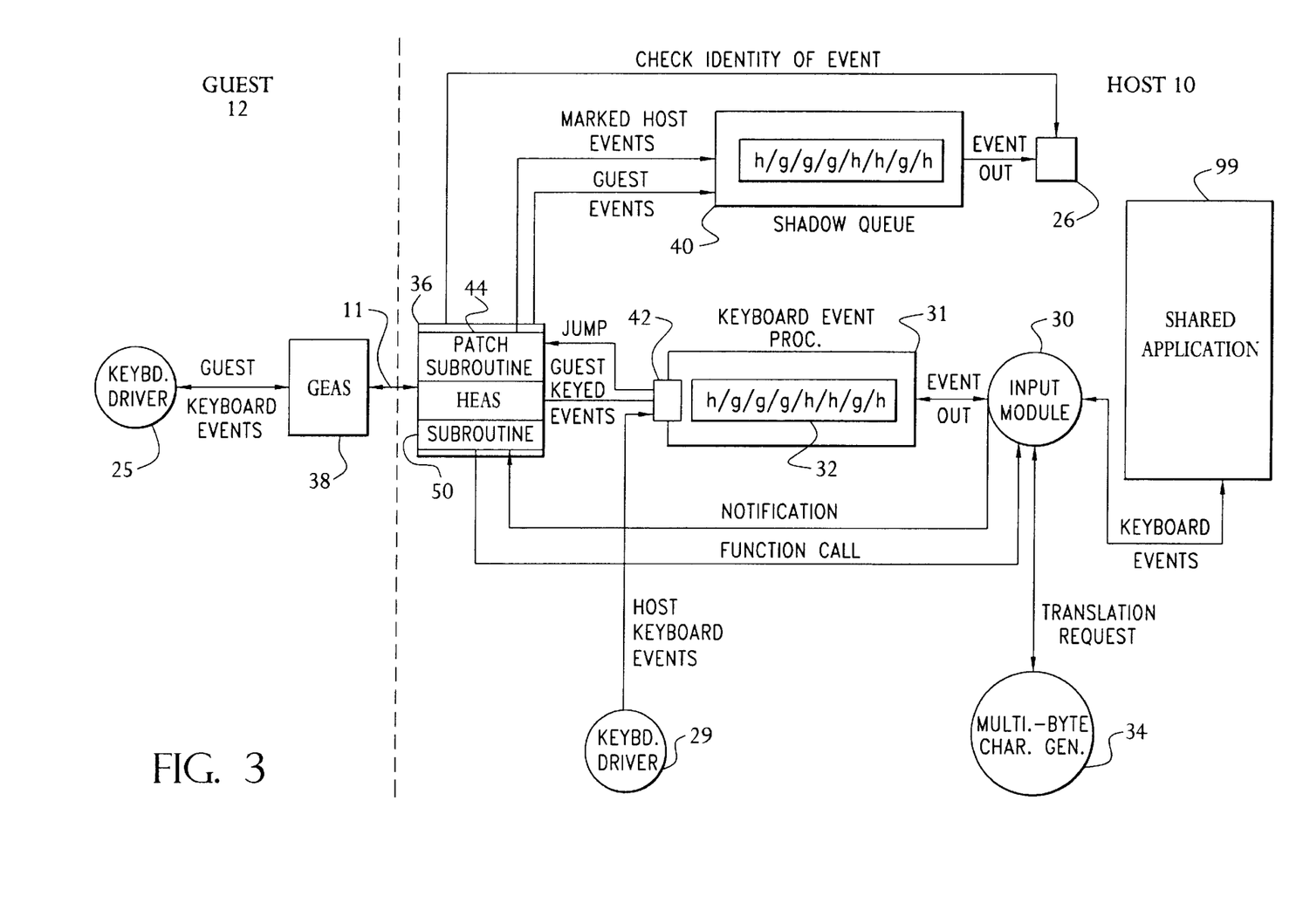
FIG. 3 is a further block diagram of software architecture of a preferred embodiment of the invention.
Figure 4A:
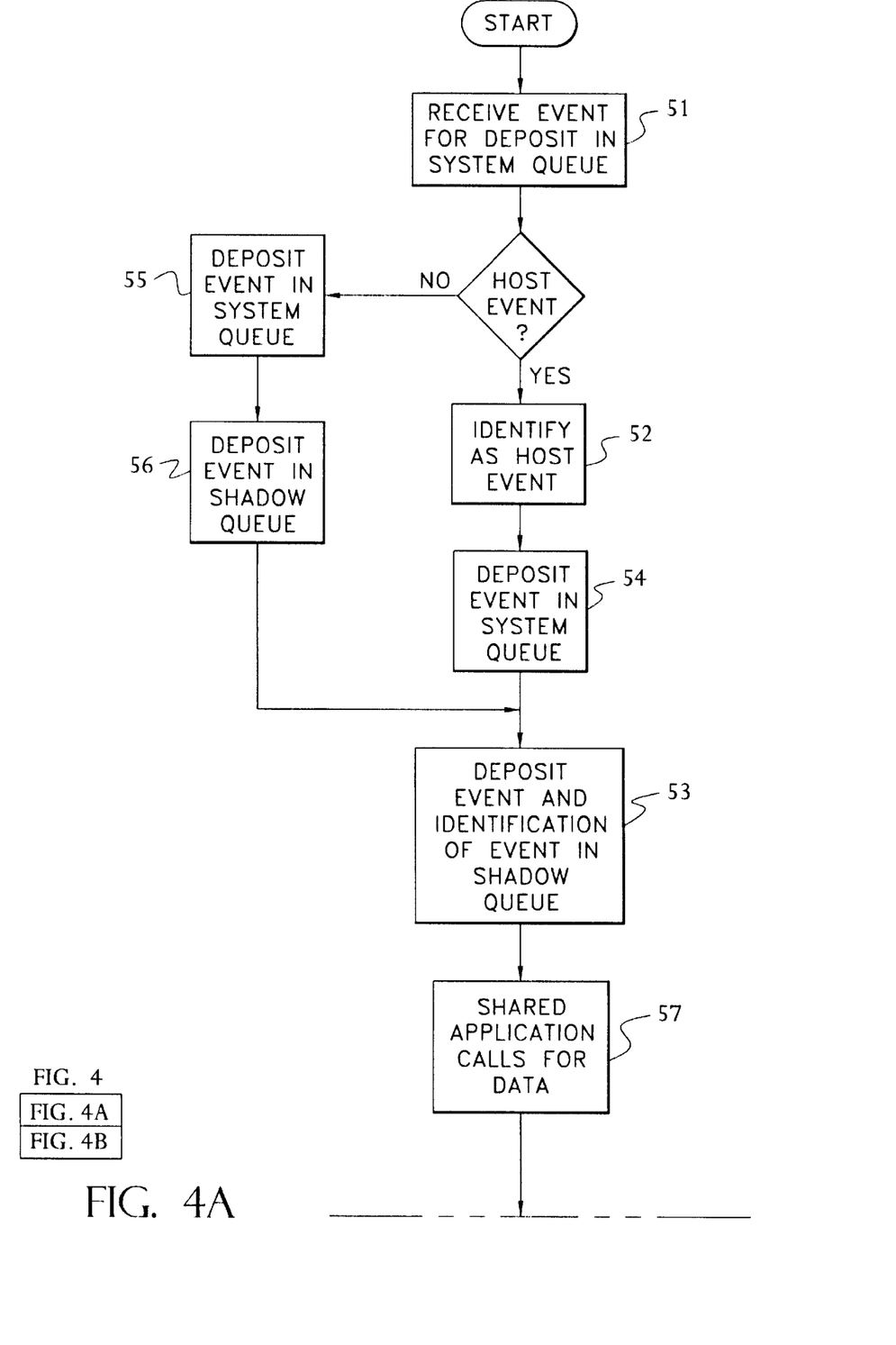
FIG. 4 is a flow chart diagram of the preferred embodiment of the invention shown in FIG. 3.
Figure 4B:
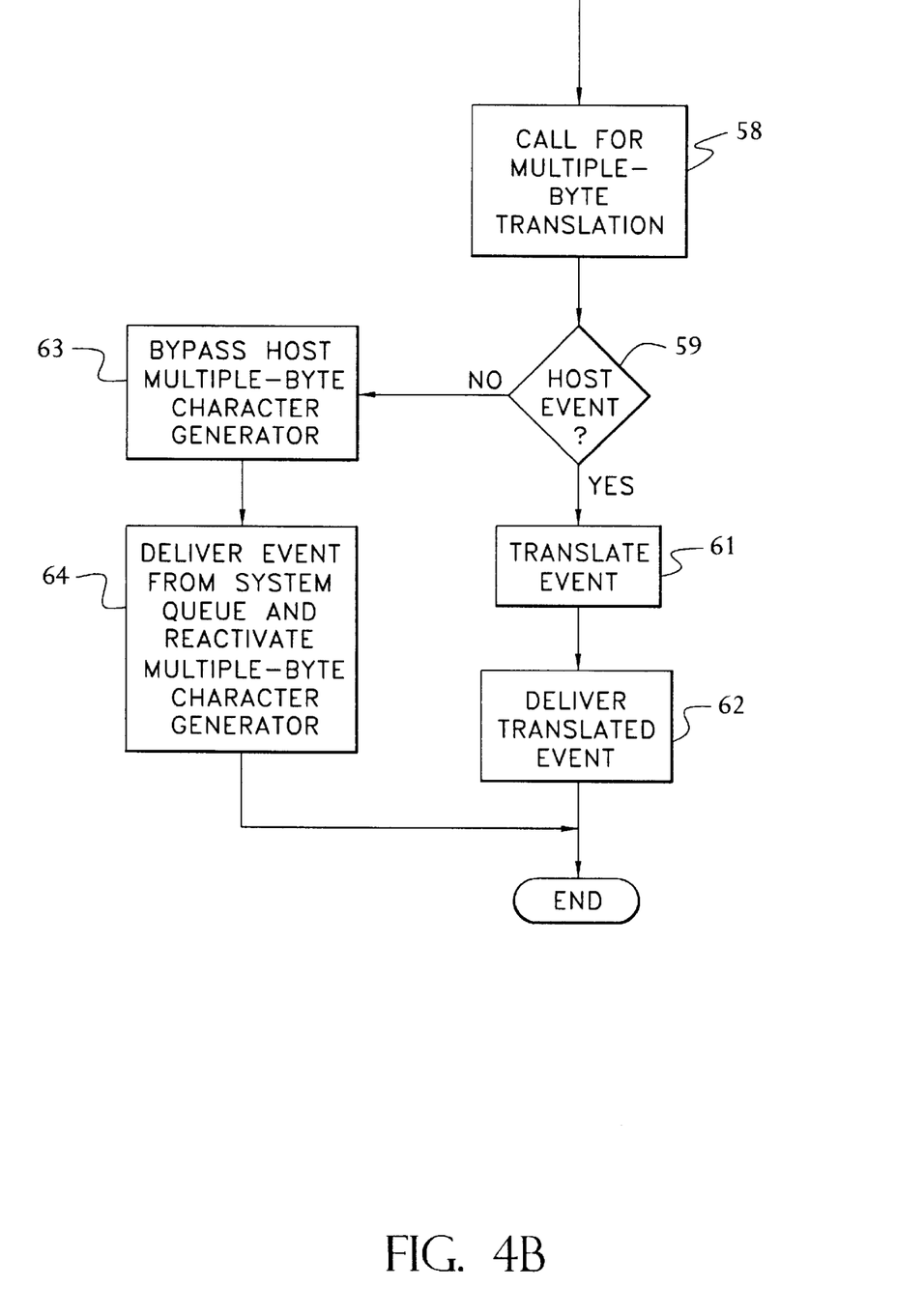

Referring now to FIGS. 3 and 4, the architecture and operation of an embodiment of the invention is shown. Guest 12 does not have a multiple-byte character generator for translating guest keyboard events. Generally, in this embodiment of the invention, guest keyboard driver 25 generates keyboard events such as single-byte keyboard events. GEAS 38 supervises delivery of the guest keyboard events over network 11 to host 10, typically as strings of data. HEAS 36 manages receipt of the guest keyboard events arriving at host 10.

Guest events from guest 12 ultimately are delivered for deposit in system queue 32 of host 10. Typically, HEAS 36 manages the delivery of guest events to host system queue 32 and, for example, calls keyboard event procedure 31 to run to place the events into system queue 32. Similarly, host keyboard events from host keyboard driver 29 also are placed in system queue 32, for example by calling keyboard event procedure 31. Keyboard driver 29 can, for example, call keyboard event procedure 31.

Keyboard event procedure 31 of host 10 handles placement of events from guest 12 and keyboard events from host 10, preferably in the order in which they are received, into system queue 32 (Step 51 of FIG. 4). System queue 32 is a first-in, first-out (FIFO) storage mechanism for the host and guest events in this applications sharing configuration.

In a preferred embodiment of the invention, shadow queue 40 is provided, also for FIFO storage and transmission of events from guest 12 and keyboard events from host 10. In addition, supplementary information typically is included with, for example, any host keyboard events input to shadow queue 40. For example, shadow queue 40 preferably carries with each host keyboard event data identifying the event as originating with the host. Shadow queue 40 can be part of HEAS 36 (as shown in FIG. 2) or can be a stand-alone data handling module.

In a preferred embodiment, keyboard event procedure 31 includes patch instruction 42. Patch instruction 42 causes a jump to patch subroutine 44 preferably located in HEAS 36, when keyboard event procedure 31 is called, for example by keyboard driver 29, to execute to place host keyboard events into system queue 32. Patch subroutine 44 marks the keyboard event as originating from the host (step 52). The marked host keyboard event is entered into shadow queue 40 (step 53) by, in the preferred embodiment, patch subroutine 44. Optionally, the unmarked host keyboard event also is deposited in shadow queue 40 (step 53). The unmarked host keyboard event is entered into system queue 32 in the conventional manner (step 54). Typically, an entry point into keyboard event procedure 31 for the deposit of host events is different than the entry point for the deposit of guest events. Therefore, in an embodiment of the invention, no patch instruction is written over the guest event entry point in keyboard event procedure 31. With respect to guest events, keyboard event procedure 31 will run in a normal fashion for deposit of the guest events into system queue 32 (step 55). Substantially simultaneously, HEAS 36 will deposit the guest event into shadow queue 40 (step 56).

In another embodiment, for example, if the entry point on keyboard event procedure 31 is the same for host and guest events, patch instruction 42 is removed from keyboard event procedure 31 or written over with original instructions, for example by HEAS 36, whenever keyboard event procedure 31 is called to execute by, for example, HEAS 36, to enter a guest event in system queue 32. This allows keyboard event procedure 31 to run in the normal fashion to deposit the guest event into host system queue 32 (step 55). Substantially simultaneously, HEAS 36 will deposit the guest event into shadow queue 40 (step 56). In this embodiment, HEAS 36 preferably replaces patch instructions 42 over keyboard event procedure 31 after keyboard event procedure 31 has run to deposit the guest event into host system queue 32. In either embodiment, patch subroutine routine 44 never is called to run when keyboard event procedure 31 is called to deposit guest events into system queue 32.

The flow of data through shadow queue 40 mirrors the flow of data through system queue 32. For example, for each position in system queue 32 holding a host or guest event, shadow queue 40 has an identical position holding, for example, the identical host or guest event, as well as additional information pertaining to the data, such as an identifier of the host event. As noted above, the host raw keyboard events preferably are marked by patch routine 44, which preferably is part of HEAS 36.

Data flows through host system queue 32 and shadow queue 40 in a FIFO order. As shown in FIG. 3, system queue 32 and shadow queue 40 stand ready to deliver host, guest, host, host, guest, guest, guest and host events, in that order, to for example, shared application 99. As shared application 99 requests data (step 57), it is advised by keyboard event procedure 31 perhaps through input module 30 of an event being delivered from system queue 32, regardless of whether it is a host or a guest event. In an embodiment, as system queue 32 outputs an event, shadow queue 40 outputs the corresponding event into event record 26. Any event already in event record 26 preferably is dumped when this occurs.

Typically, input module 30 issues a translation request (step 58) to multiple-byte character generator 34 for a translation of an event exiting system queue 32. Because guest events might not require translation into multiple-bytes, it often is undesirable for the host multiple-byte character generator 34 to translate a guest event.

In an embodiment of the invention, HEAS 36 requests notification from, for example, input module 30 when input module 30 is handling an event output from system queue 32. Input module 30 will notify HEAS 36 of the presence of the event and transfer control to HEAS 36. HEAS 36 will execute at this point to check for the identity of the event (step 59), for example by investigating the contents of event record 26, which will include data identifying the event fetched from system queue 32 as either a host or guest event. If HEAS 36 identifies the event as a guest event, HEAS 36, such as subroutine 50 of HEAS 36, calls a function in input module 30 which prevents multiple-byte character generator 34 from running or otherwise bypasses its execution to prevent it from translating the guest keyboard events output from system queue 32. After execution and return of control from subroutine 50 to input module 30, input module 30 delivers the untranslated guest keyboard events to shared application 99. Concurrently upon return of subroutine 50, multiple-byte character generator 34 is "reactivated", in that it is again ready to run to generate multiple-byte characters (step 64).

If the event is identified as a host event, multiple-byte character generator 34 is allowed to run in the normal fashion when called by input module 30 to translate (step 61) the event for delivery by input module 30 to shared application 99 (step 62). HEAS 36, for example, will not call the function in input module 30 which prevents execution of multiple-byte character generator 34, thereby allowing multiple-byte character generator 34 to execute normally to make the translation.

HEAS 36 subroutine 50, by calling input module 30 to bypass host multiple-byte character generator 34 or preventing host multiple-byte character generator 34 from running, effectively prevents host multiple-byte character generator 34 from translating the guest events. These untranslated, and in this embodiment single-byte guest events, may then be used by shared application 99.

It will be understood by those having ordinary skill in the art that the notifications given by input module 30, and the ability to call functions in input module 30 referred to above are typical provisions in, for example, input module 30 and other modules in typical operating systems which allow interfacing with separate but ancillary software modules, such as in this case HEAS 36.

In another embodiment of the invention, a patch instruction can be provided on multiple-byte character generator 34. The patch instruction acts in place of the notification provision in input module 30 to cause a jump to a patch subroutine, preferably in HEAS 36, whenever host multiple-byte character generator 34 is called for a translation of a guest or host event. The patch subroutine examines the identity of the event which multiple-byte character generator 34 has been called to translate in the manner described above.

Therefore, in this embodiment, if the subroutine identifies as a guest event the event which multiple-byte character generator 34 has been called to translate, the subroutine of HEAS 36 returns to input module 30 instructions to bypass or not execute multiple-byte character generator 34, in the manner described above. As an alternative embodiment, the patch instructions which cause a jump to the subroutine in HEAS 36 can be written over an entry point in input module 30 instead, causing a jump when input module 30 first receives events from system queue 32.

In an embodiment, a guest event exiting system queue 32 can be identified as such by examining last event record 26 for, for example, an absence of data identifying it as a host keyboard event.

In preferred embodiments, input module 30 disables multilple-byte character generator 34 in a manner which will not disturb translation of host keyboard events, especially translations which already may be in process when system queue 32 outputs a guest event.

Typically, an advisory that a multiple-byte character generator is present in host system 10 appears on a video monitor associated with host 10 (not shown in FIG. 3). As input module 30 disables multiple-byte character generator 34 in accordance with this invention, it may send messages which cause the advisory to disappear from the monitor. Similarly, when input module 30 enable multiple-byte character generator 34, it sends messages which cause the advisory to reappear on the monitor. Therefore, in an embodiment of the invention, HEAS 36 requests and receives notification from input module 30 of when it is sending messages concerning the display of the advisory. HEAS 36 intercepts those messages, thereby preventing the advisory from being continuously deleted and redisplayed, i.e., flashing on and off, as multiple-byte character generator 34 is disabled and enabled.

The invention also is capable of preventing multiple-byte character strings generated by a guest using a multiple-byte system from being processed by multiple-byte character generator 34 of the host. For example, referring now to FIG. 5, guest 12 has multiple-byte character generator 33 for generating multiple-byte characters from input from keyboard driver 25. GEAS 38 supervises transmission of the multiple-byte characters from guest 12 over network 11 to HEAS 36. HEAS 36 includes provisions for identifying the events from guest 12 as comprising multiple-byte characters. HEAS 36 will directly call input module 30 and provide to input module 30 the multiple-byte characters from guest 12. As noted above, one function of input module 30 is to control input of events into shared application 99. Consequently, input module 30 will execute to enter the guest multiple-byte characters from guest 12 into shared application 99. Multiple-byte character generator 34 is bypassed when entering guest multiple-byte characters into shared application 99.

Figure 5:
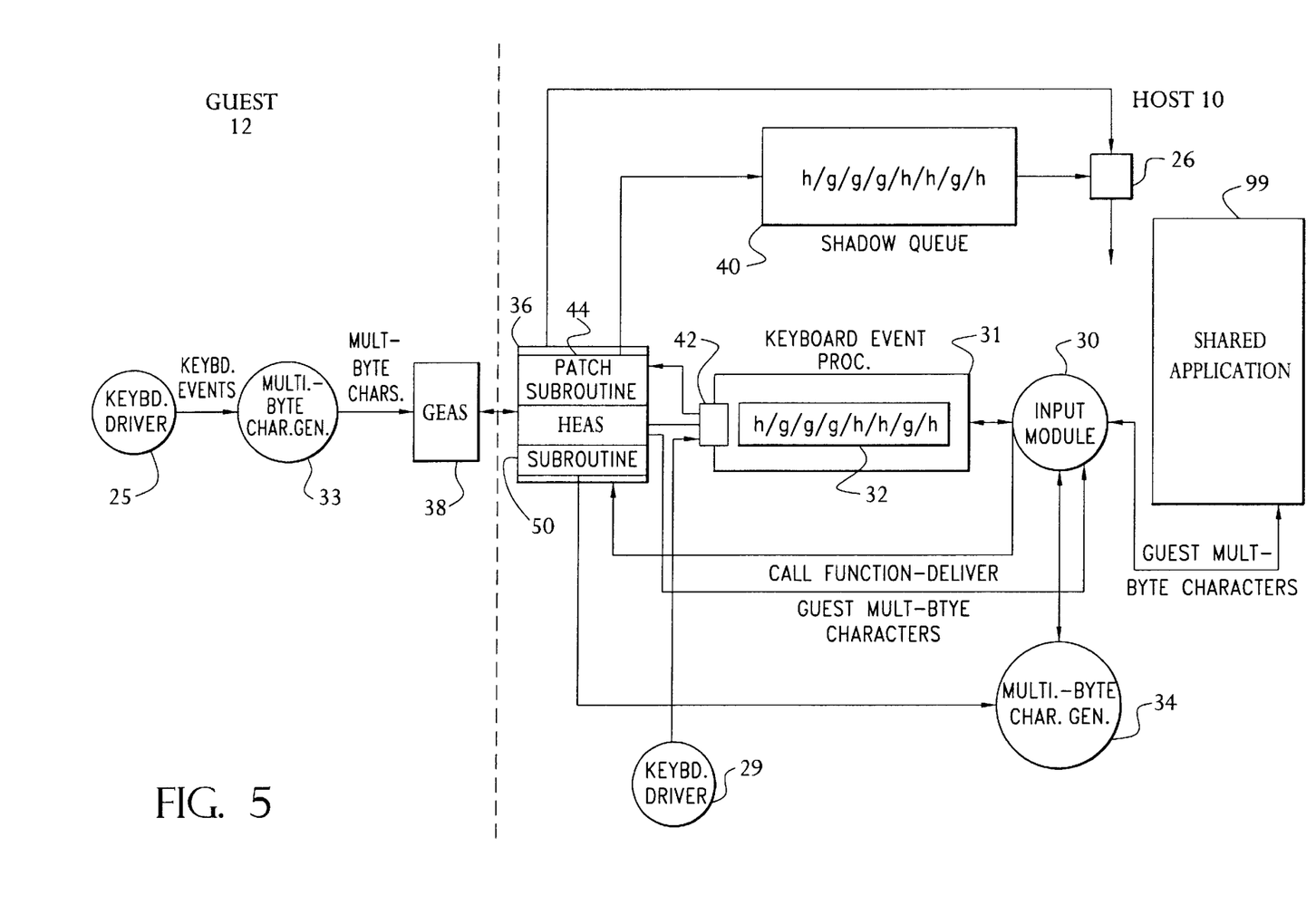
FIG. 5 is a block diagram of additional features of the software architecture of a preferred embodiment of the invention.

In another embodiment, the multiple-byte characters from guest 12 are entered into system queue 32 in the manner discussed above with respect to guest single-byte characters. Also as described above with respect to guest single-byte characters, the invention prevents translation of the guest multiple-byte characters.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When implemented on a general-purpose microprocessor, the computer program code segments configure the microprocessor to create specific logic circuits.

Furthermore, it should be understood that various changes in the details, materials, and arrangements of the parts which have been described and illustrated in order to explain the nature of this invention may be made by those skilled in the art without departing from the principle and scope of the invention as expressed in the following claims.

What we claim is:

1. A computer-implemented method for the sharing of one or more applications by a host and at least one guest, the host and at least one guest generating host and guest keyboard input, respectively, the host having a multiple-byte character generating module for processing keyboard input to generate multiple-byte characters, comprising the steps of:

(a) receiving keyboard input from the at least one guest;

(b) providing a storage queue and storing guest and host keyboard input in the storage queue:

(c) providing a shadow queue in parallel with the host storage queue:

(d) distinguishing guest keyboard input from host keyboard input;

(e) marking host keyboard input and entering the marked host keyboard input into the shadow queue to provide marked host keyboard input which corresponds to the host keyboard input stored in the host storage queue;

(f) examining an output of the shadow queue; and (g) bypassing execution of the multiple-byte character generating module when said output indicates guest keyboard input to prevent the multiple-byte character generating module from processing guest keyboard input.

2. The method of claim 1, wherein the step (e) comprises the steps of:

providing a patch instruction over entry point code to the host storage queue;

calling the entry point code; and jumping to a patch subroutine.

3. The method of claim 2, wherein the patch subroutine is in a host-executed applications-sharing program.

4. The method of claim 1, wherein step (b) comprises the step of:

instructing a host operating system module to bypass execution of the multiple-byte character generating module.

5. The method of claim 4, wherein the host operating system module is instructed by a host-executed applications-sharing program.

6. The method of claim 4, wherein the step of instructing comprises the steps of:

(i) providing a patch instruction in the multiple-byte character generating module;

(ii) calling the multiple-byte character generating module; and (iii) jumping to a patch subroutine in a host-executed applications-sharing program.

7. The method of claim 4, wherein the step of instructing comprises the steps of:

(i) jumping to a host-executed applications-sharing program;

(ii) identifying the guest keyboard input; and (iii) calling the host operating system module.

8. The method of claim 7, wherein step (iii) is executed by the host-executed applications sharing program.

9. The method of claim 1, wherein the at least one guest has a multiple-byte character generating module for generating guest multiple-byte characters, and step (b) comprises the step of:

calling a host operating system module for directly inserting the guest multiple-byte characters into the one or more applications.

10. The method of claim 9, wherein the host operating system module is called by a host-executed applications-sharing program.

11. An apparatus for the sharing of one or more applications by a host and at least one guest, the host and at least one guest generating host and guest keyboard input, respectively, the host having a multiple-byte character generating module for processing keyboard input to generate multiple-byte characters, comprising:

(a) means for receiving keyboard input from the at least one guest;

a storage queue and means for storing guest and host keyboard input in the storage queue;

(c) a shadow queue in parallel with the host storage queue;

(d) means for distinguishing guest keyboard input from host keyboard input;

(e) means for marking host keyboard input and for entering the marked host keyboard input into the shadow queue to provide marked host keyboard input which corresponds to the host keyboard input stored in the host storage queue;

(f) means for examining an output of the shadow queue; and (g) means for bypassing execution of the multiple-byte character generating module when said output indicates guest keyboard input to prevent the multiple-byte character generating module from processing guest keyboard input.

12. The apparatus of claim 11, wherein means (e):

provides a patch instruction over entry point code to the host storage queue;

calls the entry point code; and jumps to a patch subroutine, to mark the host keyboard input.

13. The apparatus of claim 12, wherein the patch subroutine is in a host-executed applications-sharing program.

14. The apparatus of claim 11, wherein means (b):

instructs a host operating system module to bypass execution of the multiple-byte character generating module.

15. The apparatus of claim 14, wherein the host operating system module is instructed by a host-executed applications-sharing program.

16. The apparatus of claim 14, wherein means (b):

(i) provides a patch instruction in the multiple-byte character generating module;

(ii) calls the multiple-byte character generating module; and (iii) jumps to a patch subroutine in a host-executed applications-sharing program which instructs the host operating system module to bypass execution of the multiple-byte character generating module.

17. The apparatus of claim 14, wherein means (b):

(i) jumps to a host-executed applications-sharing program;

(ii) identifies the guest keyboard input; and (iii) calls the host operating system module.

18. The apparatus of claim 17, wherein the call to the host operating system module is executed by the host-executed applications sharing program.

19. The apparatus of claim 11, wherein the at least one guest has a multiple-byte character generating module for generating guest multiple-byte characters, and means (b):

calls a host operating system module for directly inserting the guest multiple-byte characters into the one or more applications.

20. The apparatus of claim 19, wherein the call to the host operating system module is executed by a host-executed applications-sharing program.

21. A storage medium having stored thereon a plurality of instructions for the sharing of one or more applications by a host and at least one guest, the host and at least one guest generating host and guest keyboard input, respectively, the host having a multiple-byte character generating module for processing keyboard input to generate multiple-byte characters, wherein the plurality of instructions, when executed by a processor, cause the processor to perform the steps of:

(a) receiving keyboard input from the at least one guest;

(b) providing a storage queue and storing guest and host keyboard input in the storage queue;

(c) providing a shadow queue in parallel with the host storage queue;

(d) distinguishing guest keyboard input from host keyboard input;

(e) marking host keyboard input and entering the marked host keyboard input into the shadow queue to provide marked host keyboard input which corresponds to the host keyboard input stored in the host storage queue;

(f) examining an output of the shadow queue; and (g) means for causing the computer to bypass execution of the multiple-byte character generating module when said output indicates guest keyboard input to prevent the multiple-byte character generating module from processing guest keyboard input.

22. The storage medium of claim 21, wherein step (e) comprises the steps of:

providing a patch instruction over entry point code to the host storage queue;

calling the entry point codes; and jumping to a patch subroutine, to mark the host keyboard input.

23. The storage medium of claim 22, wherein the patch subroutine is in a host-executed applications-sharing program.

24. The storage medium of claim 21, wherein step (b) comprises the step of:

instructing a host operating system module to bypass execution of the multiple-byte character generating module.

25. The storage medium of claim 24, wherein the host operating system module is instructed by a host-executed applications-sharing program.

26. The storage medium of claim 24, wherein the step of instructing comprises the steps of:

(i) providing a patch instruction in the multiple-byte character generating module;

(ii) calling the multiple-byte character generating module; and (iii) jumping to a patch subroutine in a host-executed applications-sharing program.

27. The storage medium of claim 24, wherein the step of instructing comprises the steps of:
   (i) jumping to a host-executed applications-sharing program;
   (ii) identifying the guest keyboard input; and
   (iii) calling the host operating system module.

28. The storage medium of claim 27, wherein step (iii) is executed by the host-executed applications sharing program.

29. The storage medium of claim 21, wherein the at least one guest has a multiple-byte character generating module for generating guest multiple-byte characters, and step (b) comprises the step of calling a host operating system module for directly inserting the guest multiple-byte characters into the one or more applications.

30. The storage medium of claim 29, wherein the call to the host operating system module is executed by a host-executed applications-sharing program.

* * * * *